US008538941B2

(12) United States Patent
Gartland

(10) Patent No.: US 8,538,941 B2
(45) Date of Patent: Sep. 17, 2013

(54) VISUAL INFORMATION SEARCH TOOL

(75) Inventor: Richard A. Gartland, Bothell, WA (US)

(73) Assignee: Adobe Systems Incorporated, San Jose, CA (US)

( * ) Notice: Subject to any disclaimer, the term of this patent is extended or adjusted under 35 U.S.C. 154(b) by 623 days.

(21) Appl. No.: 12/184,037

(22) Filed: Jul. 31, 2008

(65) Prior Publication Data

US 2013/0124507 A1    May 16, 2013

(51) Int. Cl.
*G06F 17/30* (2006.01)

(52) U.S. Cl.
USPC .......................................... 707/705

(58) Field of Classification Search
None
See application file for complete search history.

(56) References Cited

U.S. PATENT DOCUMENTS

| | | | | |
|---|---|---|---|---|
| 5,875,441 | A * | 2/1999 | Nakatsuyama | 1/1 |
| 6,084,595 | A * | 7/2000 | Bach et al. | 345/589 |
| 6,512,531 | B1 | 1/2003 | Gartland | |
| 6,816,847 | B1 | 11/2004 | Toyama | |
| 6,941,323 | B1 * | 9/2005 | Galperin | 1/1 |
| 7,272,789 | B2 | 9/2007 | O'Brien | |
| 7,424,672 | B2 | 9/2008 | Simske et al. | |
| 7,475,061 | B2 * | 1/2009 | Bargeron et al. | 1/1 |
| 2002/0010704 | A1 * | 1/2002 | Kim et al. | 707/102 |
| 2002/0099721 | A1 * | 7/2002 | Ganapathy et al. | 707/104.1 |
| 2003/0195883 | A1 * | 10/2003 | Mojsilovic et al. | 707/6 |
| 2004/0102958 | A1 | 5/2004 | Anderson | |
| 2004/0122856 | A1 | 6/2004 | Clearwater | |
| 2006/0155549 | A1 * | 7/2006 | Miyazaki | 704/275 |
| 2008/0005149 | A1 | 1/2008 | McAfee | |
| 2008/0095445 | A1 | 4/2008 | Brandt | |
| 2009/0234707 | A1 | 9/2009 | Perez et al. | |

OTHER PUBLICATIONS

Eglin, Veronique; Stephane Bres, "Document page similarity based on layout visual salience: Application to query by example and document classification", 2003, IEEE, pp. 1-5.*
Schrier et al., "Adaptive Layout for Dynamically Aggregated Documents", IUI'08, Maspalomas, Gran Canaria, Spain, Jan. 13-16, 2008, 10 pages.
Gupta et al., "Document Layout Analysis and Classification and its Application in OCR", EDOCW '06, 10th IEEE International, Oct. 2006, 1 page.
"Adobe Bridge CS3", www.adobe.com/products/creativesuite/bridge/, 2008, 4 pages.
Vollick, et al., "Specifying Label Layout Styles by Example," UIST Oct. 2007, copyright 2007 ACM, pp. 221-230.

* cited by examiner

*Primary Examiner* — Dinku Gebresenbet
(74) *Attorney, Agent, or Firm* — Wolfe-SBMC

(57) ABSTRACT

The subject matter disclosed herein relates to generating a search result comprising one or more candidate documents selected based at least in part on one or more criteria associated with an input value of a visual information metric.

16 Claims, 5 Drawing Sheets

VISUAL INFORMATION SEARCH TOOL

BACKGROUND

Data processing tools and techniques continue to improve. Information in the form of data is continually being generated or otherwise identified, collected, stored, shared, and analyzed. Databases and other like data repositories are commonplace, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be analyzed in an efficient manner. For example, search engines may be utilized by graphic designers to search for electronic documents for particular designs and/or design examples based on keywords associated with such electronic documents. Alternatively, graphic designers may have file browsers at their disposal for accessing particular designs and/or design examples on a given computer or database. Such file browsers may be utilized to view and/or peruse files. However, neither file browsers nor search engines may be particularly suited to performing a search based on utilizing a particular aspect of a given design as a search criteria.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
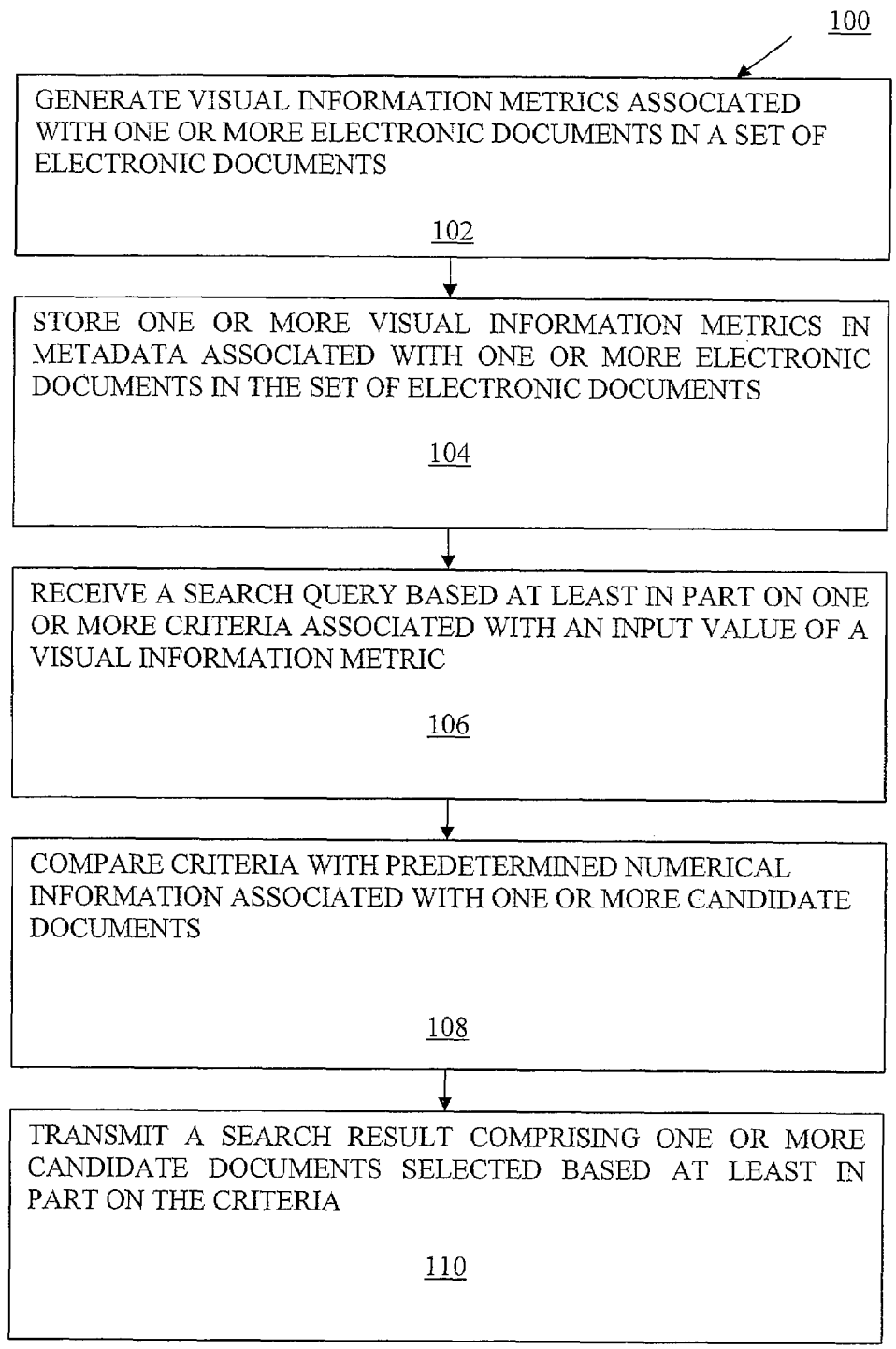
FIG. 1 is a flow diagram illustrating a procedure for generating visual information metrics associated with electronic documents in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As discussed above, graphic designers may have file browsers at their disposal to view and/or peruse electronic documents. Additionally, search engines may be utilized by graphic designers to search for electronic documents containing keywords. However, neither file browsers nor search engines may be particularly suited to performing a search based on utilizing a particular aspect of a given design as a search criteria. For example, when working on a given design, it may be useful for a user to be able to search for other similar or dissimilar designs utilizing graphical and/or visual criteria.

As will be described in greater detail below, embodiments described herein relate to generating a search result comprising one or more candidate electronic documents selected based at least in part on one or more criteria associated with an input value of a visual information metric. For example, such electronic documents may be searched for on a user's computer, a database, a network, and/or on the Internet. In order to facilitate such visual searches, a cataloguing scheme for electronic documents may be utilized that is based at least in part on visual characteristics of a design of a given electronic document. Accordingly, a user may look for available designs from existing electronic documents that are more or less similar to a given starting electronic document using several metrics.

For example, it may be useful for a user to search electronic documents by indicating a design with a desired level of a visual information metric such as whitespace, contrast, balance, the like, and/or combinations thereof. Such a search may be presented to a user so as to allow a user to select a desired level of one or more visual information metrics from a range of possible values. Alternatively, a search may be presented to a user so as to allow a user to select a desired level of one or more visual information metrics from a range of possible values associated with a sample document. Further, a search may be presented to a user so as to allow a user to select a desired level of one or more visual information metrics from a range of possible values associated between two or more sample documents.

Procedure 100 illustrated in FIG. 1 may be used to generate visual information metrics associated with electronic documents in accordance with one or more embodiments, for example, although the scope of claimed subject matter is not limited in this respect. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. As illustrated, procedure 100 may begin at block 102 where one or more visual information metrics may be generated. As used herein, the term "visual information metric" is meant to include, but may not be limited to the following: overall grey values, color values, balance, contrast, whitespace, the like, and/or combinations thereof. For example, such overall visual information metrics may comprise a single value that represents a given attribute being considered, such as average values, mean values, median values, and/or the like. Additionally or alternatively, such visual information metrics may include visual properties regarding page layout such as number and/or placement of columns of text within a given electronic document, number and/or placement of images within a given electronic document, number and/or placement of captions, and/or the like. Such visual information metrics may be generated based on information from one or more associated electronic documents in a set of electronic documents.

As used herein, the term "electronic document" is meant to include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example, as may be displayed on a web page. Also, for one or more embodiments, the elements may comprise a graphical object, such as, for example, a digital image.

Visual information metrics may be determined based at least in part on image processing tests run against an electronic document itself and/or a thumbnail image of the electronic document. For example, electronic documents may be rendered to a given format such as Joint Photographic Experts Group (JPEG), Portable Document Format (PDF), and/or the like. Thumbnail images may then be extracted from all or a portion of the electronic document, such as from a first page of the electronic document. Additionally or alternatively, thumbnail data may be extracted from data stored in metadata contained in a given electronic document, such as Extensible Metadata Platform (XMP) metadata, for example.

A given electronic document, such as a thumbnail portion, may be analyzed by any number of different image processing filters. Such image processing filters may determine visual information metric values such as an overall average gray value, a density balance in left-right and/or top-bottom axes, an extent of pure whitespace, the like, and/or combinations thereof. For example, one such image processing filter may calculate an average grey value and/or a horizontal midpoint in an overall color/grayscale density based at least in part on analyzing pixels of at least a portion of a given electronic document to produce a contribution to an overall visual information metric value associated with the given filter. Analogous procedures may be utilized by other image processing filters for determining other visual information metrics, although this is merely an example. Additionally or alternatively, a given electronic document, such as a thumbnail portion, may be analyzed by any number of different image processing techniques so as to determine visual information metrics that may include visual properties regarding page layout. As used herein the term "page layout" may refer to an arrangement of text and/or graphics objects within a given electronic document, such as number and/or placement of columns of text within a given electronic document, number and/or placement of images within a given electronic document, number and/or placement of captions, and/or the like. Such determined visual information metric values may be associated with the electronic document from which they were determined. For example, at block 104, such visual information metrics may be stored in metadata associated with such electronic documents. As will be described in greater detail below, such visual information metrics may be utilized to search electronic documents on a visual basis on a user's computer, a database, and/or a network.

At block 106, a search query may be received from a user. Such a search query may be based at least in part on one or more criteria associated with an input value of a visual information metric. As discussed above, such a search query may be submitted to search a local computer or database. Searching in an Internet environment will be discussed in greater detail below with respect to FIG. 2.

At block 108, such criteria may be compared with predetermined numerical information associated with one or more candidate documents. For example, such predetermined numerical information may comprise visual information metrics stored in metadata, as discussed above with respect to block 104. Accordingly, such a comparison may operate on a document-by-document comparison of given criteria to given document metadata. Additionally or alternatively, predetermined numerical information may be stored and/or organized within an index referencing a set of electronic documents, where a given criteria may be compared to predetermined numerical information associated with such a set of electronic documents. At block 110, a search result may be transmitted to a user. For example, such a search result may comprise one or more candidate documents selected based at least in part on criteria as defined by a user.

Additionally or alternatively, two or more values of such visual information metrics may be concatenated together. For example, two or more of such metric values may be concatenated together into a single visual information metric value. Where visual information metrics comprise two or more of the following quantifiable attributes: balance, contrast, whitespace, grey value, color value, or combinations thereof, such visual information metric values may be concatenated together into a single value. In such a case, predetermined numerical information associated with two or more visual information metric values may be concatenated together into a single value. Additionally, a search query comprising input values for two or more visual information metrics may likewise be concatenated together into a single value. Accordingly, a comparison at block 108 may operate to compare concatenated predetermined numerical information to a concatenated input value for two or more visual information metrics associated with a given query.

Additionally or alternatively, such concatenation may not necessarily be pre-calculated. For example, in situation where there are two or more values of such visual information metrics associated with a given electronic document, a given search query from a user might stipulate to use a subset of such values. Predetermined numerical information associated with two or more visual information metric values may be selected to be concatenated together into a single value based at least in part on which metrics are specified by a user within a given search query.

Figure 2:
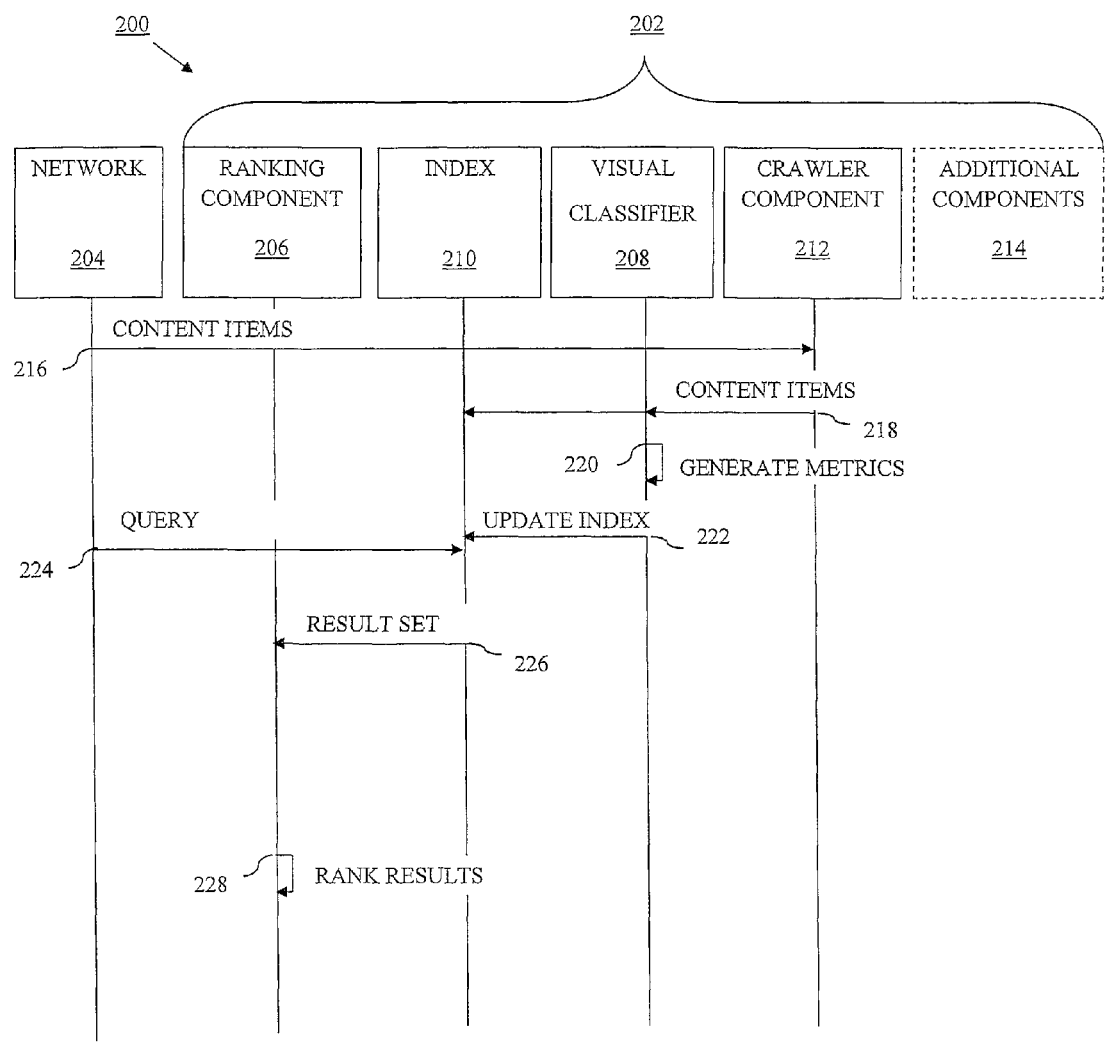
FIG. 2 is a flow diagram illustrating a procedure for indexing and/or ranking electronic documents in accordance with one or more embodiments.

Procedure 200 illustrated in FIG. 2 may be used to index and/or rank electronic documents in accordance with one or more embodiments, for example, although the scope of claimed subject matter is not limited in this respect. Additionally, although procedure 200, as shown in FIG. 2, comprises one particular order of actions, the order in which the actions are presented does not necessarily limit claimed subject matter to any particular order. Likewise, intervening actions not shown in FIG. 2 and/or additional actions not shown in FIG. 2 may be employed and/or actions shown in FIG. 2 may be eliminated, without departing from the scope of claimed subject matter.

Procedure 200 depicted in FIG. 2 may in alternative embodiments be implemented in software, hardware, and/or firmware, and may comprise discrete operations. As illustrated, procedure 200 governs the operation of a search engine 202. Search engine 202 may be capable of searching for content items of interest. Search engine 202 may communicate with a network 204 to access and/or search available information sources. By way of example, but not limitation, network 204 may include a local area network, a wide area network, the like, and/or combinations thereof, such as, for example, the Internet. Additionally or alternatively, search engine 202 and its constituent components may be deployed across network 204 in a distributed manner, whereby components may be duplicated and/or strategically placed throughout network 204 for increased performance.

Search engine 202 may include multiple components. For example, search engine 202 may include a ranking component 206, a visual classifier 208, an index 210, and/or a crawler component 212, as will be discussed in greater detail below. Additionally or alternatively, search engine 202 also may include additional components 214 that are not described in detail herein. For example, search engine 202 also may include a search component capable of searching the content items retrieved by crawler component 212.

Additionally, although the additional components 214 of search engine 202, as shown in FIG. 2, have been described above with non-limiting example components, the examples given do not necessarily limit claimed subject matter to any particular configuration. For example, further additional components 214 not discussed with respect to FIG. 2 may be employed, without departing from the scope of claimed subject matter. Further, although the additional components 214 of search engine 202, as shown in FIG. 2, have been described above with non-limiting example components, the examples given may be eliminated, without departing from the scope of claimed subject matter.

Crawler component 212 may retrieve content items from network 204, as illustrated at action 216. For example, crawler component 212 may retrieve content items and store a copy in a cache (not shown). Additionally, crawler component 212 may follow links between content items so as to navigate across the Internet and gather information on an extensive number of electronic documents. For example, such content items may comprise a set of electronic documents retrieved from network 204.

Data from content items gathered by crawler component 212 may be sent to index 210, as illustrated at action 218. Index 210 may index such content items, as illustrated at action 220. For example, index 210 may be updated based at least in part on content items comprising a set of electronic documents. Index 210 may parse a given content item into indexable terms. Additionally, identifying information of the electronic documents associated with such indexable terms also may be indexed so that a given indexable term may be located via a corresponding electronic document.

Data from content items gathered by crawler component 212 may be sent to visual classifier 208, as illustrated at action 218. Visual classifier 208 may calculate data regarding visual information metrics that may associate predetermined numerical information to a given electronic document. As discussed above with respect to FIG. 1, such predetermined numerical information related to visual information metrics may be determined based at least in part on image processing tests run against the electronic document itself and/or a thumbnail image of the electronic document, as illustrated at action 220.

Predetermined numerical information from content items determined by visual classifier 208 may be sent to index 210, as illustrated at action 222. Index 210 may be updated to index such content items based at least in part on such predetermined numerical information. Accordingly, index 210 may parse a given content item into indexable terms and/or given predetermined numerical information related to visual information metrics. Additionally, identifying information of the electronic documents also may be indexed so that predetermined numerical information related to visual information metrics may be located via a corresponding electronic document. For example, such predetermined numerical information may be indexed with a link associated to a given electronic document, such as a Uniform Resource Locator (URL) link.

Additionally or alternatively, index 210 may incorporate visual information metrics that have been pre-stored in metadata associated with electronic documents. In such a situation, electronic documents crawled from the Internet may comprise metadata that may include visual information metrics. For example, electronic documents processed according to procedure 100 (see FIG. 1), or other similar procedures, may associate visual information metrics with electronic documents by storing such with electronic documents within metadata. In such an instance, index 210 and/or visual classifier 208 may extract such predetermined numerical information directly from the metadata with and/or without generating such information at action 220.

Ranking component 206 may receive a search result set from index 210 based at least in part on query 224, as illustrated at action 226. For example, search engine 202 also may include a search component (not shown) capable of searching the electronic documents indexed within index 210 so as to generate a result set. Such a search query may be based at least in part on one or more criteria associated with an input value of a visual information metric.

Ranking component 206 may be capable of ranking such a result set such that the most relevant electronic documents in the result set are presented to a user first, according to descending relevance, as illustrated at action 228. For example, the first electronic document in the result set may be the most relevant in response to a given criteria associated with a given query and the last electronic document in the result set may be the least relevant while still falling within the scope of the query. Such a ranked result set may comprise a search result that may be transmitted to a user via a search interface. Such a ranking procedure may be based at least in part on the predetermined numerical information related to visual information metrics generated via visual classifier 208. Once ranking component 206 has received a result set, ranking component 206 may determine an importance score associated with the electronic documents from the result set. Such an importance score associated with the electronic documents may be based at least in part on how closely the predetermined numerical information matches with a given criteria associated with a given query.

Figure 3:
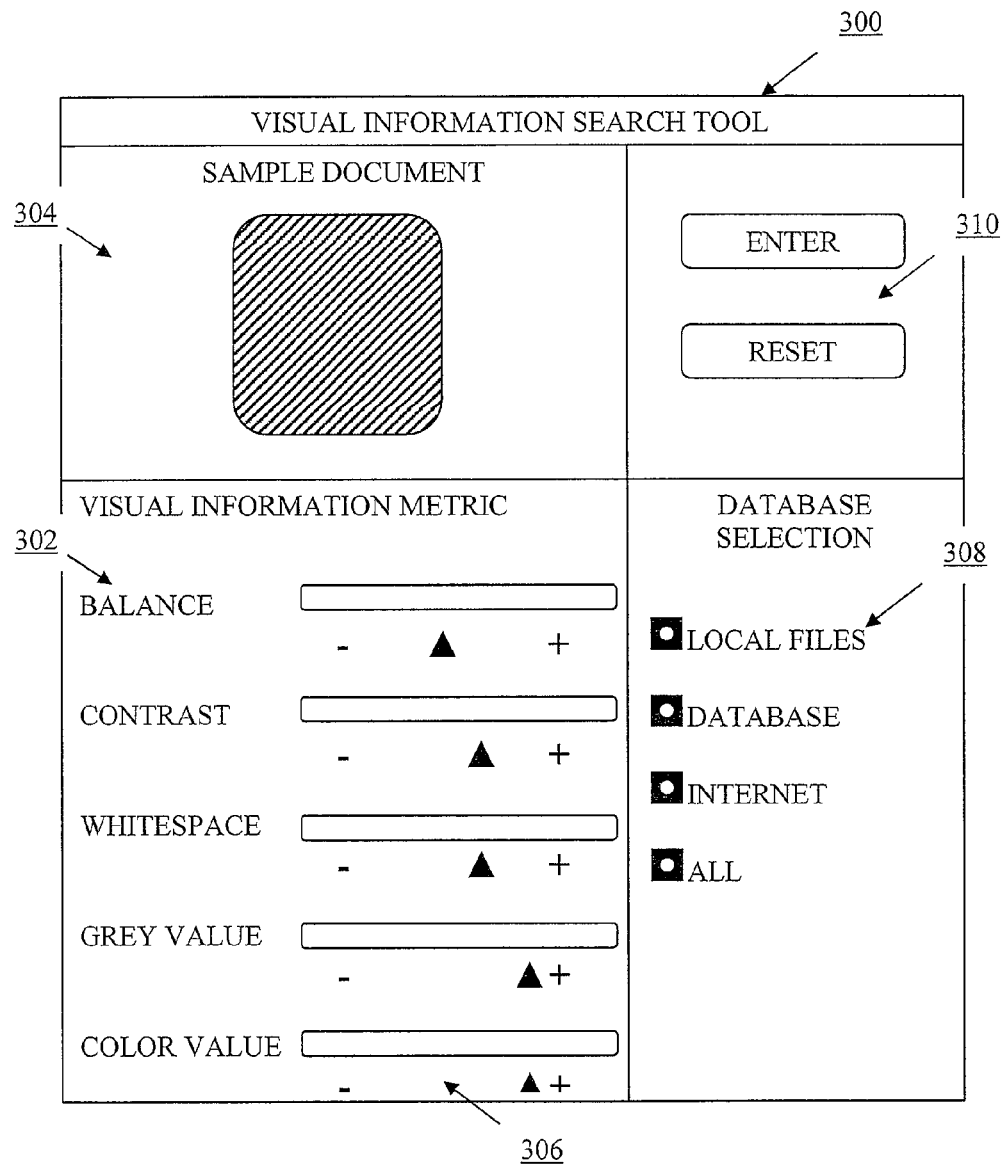
FIG. 3 is a diagram illustrating a user interface in accordance with one or more embodiments.

Referring to FIG. 3, a user interface is illustrated in accordance with one or more embodiments. An example user interface 300 is illustrated where a user may select a desired level of one or more visual information metrics 302 from a range of possible values associated with a sample document 304. For example, user interface 300 may include controls adapted to adjust visual information metric values for more or less similarity as compared to a sample document per individual visual information metrics. Slider-like controls 306 are illustrated here for this purpose; however, other controls, such as dials, bars, the like, and/or combinations thereof may be utilized in such a user interface. For example, input values associated with one or more search criteria may be based at least in part on one or more input values associated with one or more sample documents and/or based at least in part on one or more user selected input values. Additionally or alternatively, user interface 300 may include database selection controls 308 adapted to permit a user to select one or more of the following locations to search for electronic documents: a user's computer, a database, a network, the Internet, and/or the like. Further, reset control 310 may allow a user to set and/or reset visual information metric values to a default setting, such as a setting that reflects the values associated with a sample document 304.

For example, a search may be conducted based at least in part on the visual information metric values 302 as indicated by the user interface 300. Some or all visual information metric values 302 may be set at a default value so as to correspond with sample document 304, while some or all visual information metric values 302 may be adjusted by a user so as to be less or more than such a default value.

Based at least in part on such default values and/or adjusted values, a query may be generated for finding electronic documents corresponding to such a query. Search results may be returned and ranked in order of the closest matches to the given query. Optionally, a user may be permitted to select a new sample document 304 from the search result or from some other database or source and iterate the search process. For example, a user may designate of one or more candidate documents 304 as one or more sample documents; whereupon, visual information metric values 302 may be adjusted automatically to reflect visual information metric values 302 associated with the designated sample documents 304 and/or be based at least in part on one or more user selected input values. Accordingly, a user may iterate through a series of searches based on a series of sample documents 304 and/or a series of adjusted visual information metric values 302 to intentionally navigate through various design options in search of a similar match.

Additionally or alternatively, user interface 300 may include other controls (not shown) adapted to specify other visual information metrics that may include visual properties regarding page layout such as number and/or placement of columns of text within a given electronic document, number and/or placement of images within a given electronic document, number and/or placement of captions, and/or the like. Such visual information metrics associated with visual properties regarding page layout may support queries that ask for "more columns," and/or the like, for instance.

Additionally or alternatively, no sample document 304 may be provided. For instance, a user may select one or more visual information metrics 302 from a range of possible values independently of a sample document 304. Upon viewing a returned search result, a user may then again adjust visual information metrics 302 without selecting a sample document 304. Alternatively, a user may select a sample document 304, whereupon sample document 304 may be utilized to set and/or reset visual information metric values to a default setting, such as a setting that reflects the values associated with sample document 304.

Figure 4:
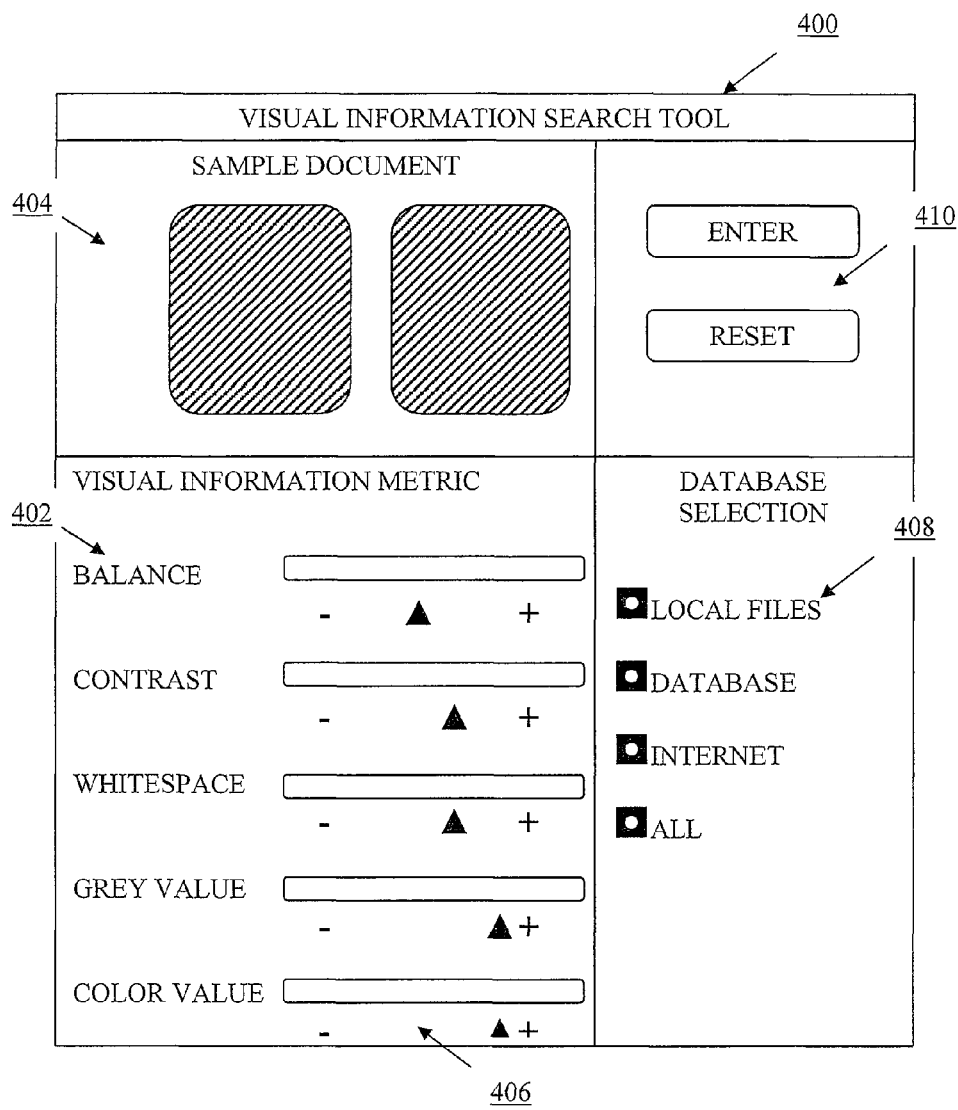
FIG. 4 is a diagram illustrating a user interface in accordance with one or more embodiments.

Referring to FIG. 4, a user interface is illustrated in accordance with one or more embodiments. An example user interface 400 is illustrated where a user may select a desired level of one or more visual information metrics 402 from a range of possible values associated with two or more sample documents 304. For example, user interface 400 may include controls adapted to adjust visual information metric values for more or less similarity as compared to a range of visual information metric values spanning between a first and second sample document 404. Slider-like controls 406 are illustrated here for this purpose; however, other controls, such as dials, bars, the like, and/or combinations thereof may be utilized in such a user interface. Additionally or alternatively, user interface 400 may include other controls adapted to specify other visual information metrics that may include visual properties regarding page layout such as number and/or placement of columns of text within a given electronic document, number and/or placement of images within a given electronic document, number and/or placement of captions, and/or the like.

Figure 5:
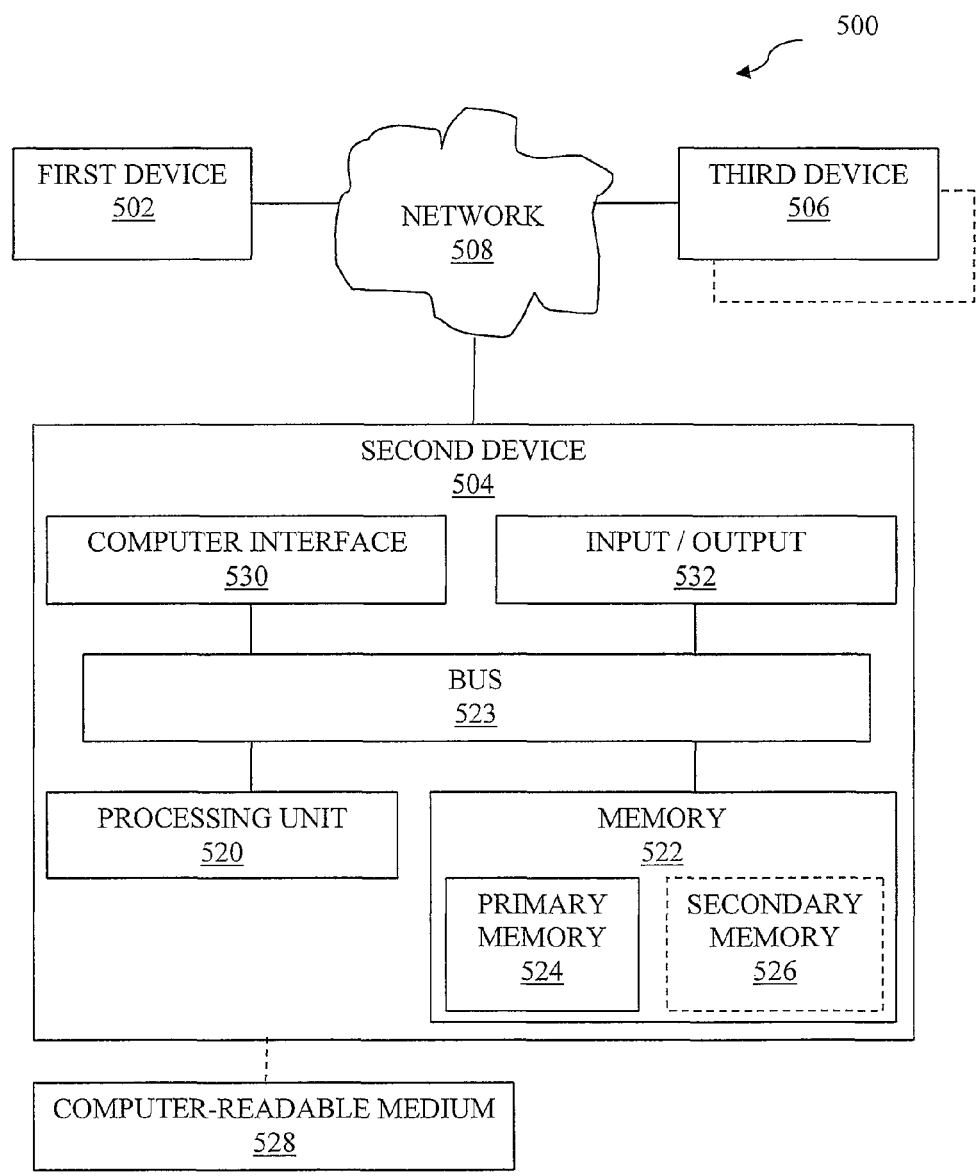
FIG. 5 is a schematic diagram of a computing platform in accordance with one or more embodiments.

FIG. 5 is a schematic diagram illustrating an exemplary embodiment of a computing environment system 500 that may include one or more devices configurable to generate a search result based at least in part on an input value of a visual information metric using one or more techniques illustrated above, for example. System 500 may include, for example, a first device 502, a second device 504, and a third device 506, which may be operatively coupled together through a network 508.

First device 502, second device 504, and third device 506, as shown in FIG. 5, may be representative of any device, appliance or machine that may be configurable to exchange data over network 508. By way of example, but not limitation, any of first device 502, second device 504, or third device 506 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 508, as shown in FIG. 5, is representative of one or more communication links, processes, and/or resources configurable to support the exchange of data between at least two of first device 502, second device 504, and third device 506. By way of example, but not limitation, network 508 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 506, there may be additional like devices operatively coupled to network 508.

It is recognized that all or part of the various devices and networks shown in system 500, and the processes and methods as further described herein, may be implemented using, or otherwise including, hardware, firmware, software, or any combination thereof.

Thus, by way of example, but not limitation, second device 504 may include at least one processing unit 520 that is operatively coupled to a memory 522 through a bus 523.

Processing unit 520 is representative of one or more circuits configurable to perform at least a portion of a data computing procedure or process. By way of example, but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any data storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more data storage devices or systems, such as, for example, a disk drive, an optical disc drive, a tape drive, a solid state memory drive, etc. In certain implementations, secondary memory 526 may be operatively receptive of, or otherwise configurable to couple to, a computer-readable medium 528. Computer-readable medium 528 may include, for example, any medium that can carry and/or make accessible data, code and/or instructions for one or more of the devices in system 500.

Second device 504 may include, for example, a communication interface 530 that provides for or otherwise supports the operative coupling of second device 504 to at least network 508. By way of example, but not limitation, communication interface 530 may include a network interface device or card, a modem, a router, a switch, a transceiver, and the like.

Second device 504 may include, for example, an input/output 532. Input/output 532 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 532 may include an operatively configured display, speaker, keyboard, mouse, trackball, touch screen, data port, etc.

With regard to system 500, in certain implementations, first device 502 may be configurable to tangibly embody all or a portion of procedure 100 of FIG. 1, and/or procedure 200 of FIG. 2. In certain implementations, first device 502 may be configurable to return a search result and/or rank electronic documents using one or more techniques illustrated above. For example, a process may be performed via first device 502 where a query may be received that is based at least in part on visual information metric values. First device 502 may return search results and/or rank such search results in order of the closest matches to the given query.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, also may be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
   receiving a sample document that includes a text portion;
   in response to said receiving, automatically generating a visual information metric for the sample document that corresponds to a layout of at least the text portion or to a visual appearance of at least the text portion of the received sample document, wherein the visual information metric is represented by a value for the sample document, the value comprising two or more quantifiable attributes concatenated together into a single value, wherein said quantifiable attributes include balance, contrast, whitespace, grey value, color value, page layout, or combinations thereof;

receiving an adjustment to the value, wherein the adjusted value represents a change to the layout or to the visual appearance, wherein the change is relative to the layout of at least the text portion of the received sample document or to the visual appearance of at least the text portion of the received sample document;

comparing the adjusted value with predetermined numerical information regarding layout of respective text portions of one or more candidate documents or regarding visual appearance of respective text portions of one or more candidate documents, wherein said comparing identifies the one or more candidate documents that reflect a document having the change applied to the sample document; and transmitting a search result, wherein said search result comprises one or more candidate documents selected based at least in part on said comparison.

2. The method of claim 1, wherein the visual information metric comprises two or more visual information metric values concatenated into a single value.

3. The method of claim 1, further comprising:
receiving a designation of one of said candidate documents as the sample document; and
iteratively performing said receiving an adjustment adjusting, said comparing, and said transmitting based on the designated sample document.

4. The method of claim 1, further comprising ranking said one or more candidate documents in said search result based at least in part on said comparison.

5. The method of claim 1, further comprising:
generating one or more visual information metrics that corresponds to a layout or visual appearance of at least the text portion of one or more electronic documents in a set of electronic documents;
storing said one or more visual information metrics in metadata associated with said one or more electronic documents in said set of electronic documents; and
wherein said search result is based at least in part on said metadata.

6. The method of claim 1, further comprising:
generating one or more visual information metrics that correspond to a layout or visual appearance of at least the text portion of one or more electronic documents in a set of electronic documents; and
indexing said set of electronic documents based at least in part on said one or more visual information metrics;
wherein said search result is based at least in part on said indexing.

7. The method of claim 1, wherein said search result is based at least in part on one or more thumbnail images of said one or more candidate documents.

8. The method of claim 1, further comprising:
generating one or more visual information metrics that correspond to a layout or visual appearance of at least the text portion of one or more electronic documents in a set of electronic documents;
storing said one or more visual information metrics in metadata associated with said one or more electronic documents in said set of electronic documents;
receiving a designation of one or more of said candidate documents as the sample document;
receiving an adjustment to an input value of a visual information metric corresponding to the layout or visual appearance of at least the text portion of the designated sample document; and
ranking said one or more candidate documents in said search result based at least in part on said comparison, wherein said search result is based at least in part on said metadata.

9. The method of claim 1, further comprising:
generating one or more visual information metrics that correspond to the layout or visual appearance of at least the text portion of one or more electronic documents in a set of electronic documents;
indexing said set of electronic documents based at least in part on said one or more visual information metrics;
receiving a designation of one or more of said candidate documents as the sample document;
receiving an adjustment to an input value of a visual information metric corresponding to the layout or visual appearance of at least the text portion of the designated sample document; and
ranking said one or more candidate documents in said search result based at least in part on said comparison, wherein said search result is based at least in part on said indexing.

10. An article, comprising:
a storage medium excluding signals and comprising machine-readable instructions stored thereon which, responsive to execution by a computing platform, direct computing platform to:
receive a sample document that includes a text portion;
in response to said receiving, automatically generate a visual information metric for the sample document that corresponds to a layout of at least the text portion or to a visual appearance of at least the text portion of the received sample document, wherein the visual information metric is represented by a value for the sample document, the value comprising two or more quantifiable attributes concatenated together into a single value, wherein said quantifiable attributes include at least balance, contrast, whitespace, grey value, color value, page layout, or combinations thereof;
receive an adjustment to the value, wherein the adjusted value represents a change to the layout or to the visual appearance, wherein the change is relative to the layout of at least the text portion of the received sample document or to the visual appearance of at least the text portion of the received sample document;
compare the adjusted value with predetermined numerical information regarding layout of respective text portions of one or more candidate documents or regarding visual appearance of respective text portions of one or more candidate documents, wherein said comparing identifies the one or more candidate documents that reflect a document having the change applied to the sample document; and
transmit a search result, wherein said search result comprises one or more candidate documents selected based at least in part on said comparison.

11. The article of claim 10, wherein said machine-readable instructions, responsive to execution by computing platform, further direct computing platform to:
receive a designation of one or more of said candidate documents as the sample document; and receive an adjustment to an input value of a visual information metric associated with the designated sample document.

12. The article of claim 10, wherein said machine-readable instructions, responsive to execution by computing platform, further direct computing platform to:
   generate one or more visual information metrics that correspond to a layout or visual appearance of at least the text portion of one or more electronic documents in a set of electronic documents;
   store said one or more visual information metrics in metadata associated with said one or more electronic documents in said set of electronic documents; receive a designation of one or more of said candidate documents as the sample document;
   receive an adjustment to an input value of a visual information metric corresponding to the layout or visual appearance of at least the text portion the designated sample document; and
   rank said one or more candidate documents in said search result based at least in part on said comparison, wherein said search result is based at least in part on said metadata.

13. The article of claim 10, wherein said machine-readable instructions, responsive to execution by computing platform, further direct computing platform to:
   generate one or more visual information metrics that correspond to the layout or visual appearance of at least the text portion of one or more electronic documents in a set of electronic documents;
   index said set of electronic documents based at least in part on said one or more visual information metrics;
receive a designation of one or more of said candidate documents as the sample document;
   receive an adjustment to an input value of a visual information metric corresponding to the layout or visual appearance of at least the text portion of the designated sample document; and
   rank said one or more candidate documents in said search result based at least in part on said comparison, wherein said search result is based at least in part on said indexing.

14. An apparatus, comprising:
   a computing platform, said computing platform being configured to:
   receive a sample document that includes a text portion;
      in response to said receiving, automatically generate a visual information metric for the sample document that corresponds to a layout of at least the text portion or to a visual appearance of at least the text portion of the received sample document, wherein the visual information metric is represented by a value for the sample document, the value comprising two or more quantifiable attributes concatenated together into a single value, wherein said quantifiable attributes include at least balance, contrast, whitespace, grey value, color value, page layout, or combinations thereof;
      receiving an adjustment to the value, wherein the adjusted value represents a change to the layout or to the visual appearance, wherein the change is relative to the layout of at least the text portion of the received sample document or to the visual appearance of at least the text portion of the received sample document;
      compare the adjusted value with predetermined numerical information regarding layout of respective text portions of one or more candidate documents or regarding visual appearance of respective text portions of one or more candidate documents, wherein said comparing identifies the one or more candidate documents that reflect a document having the change applied to the sample document; and
      transmit a search result, wherein said search result comprises one or more candidate documents selected based at least in part on said comparison.

15. The apparatus of claim 14, wherein said computing platform is further adapted to:
   receive a designation of one or more of said candidate documents as the sample document; and
   iteratively perform said receiving an adjustment, comparing, and transmitting based on the designated sample document.

16. The apparatus of claim 14, wherein said computing platform is further adapted to:
   generate one or more visual information metrics that correspond to a layout or visual appearance of at least the text portion of one or more electronic documents in a set of electronic documents;
   store said one or more visual information metrics in metadata associated with said one or more electronic documents in said set of electronic documents;
   receive a designation of one or more of said candidate documents as the sample document;
   receive an adjustment to an input value of a visual information metric corresponding to the layout or visual appearance of at least the text portion of one or more criteria of the designated sample document; and
   rank said one or more candidate documents in said search result based at least in part on said comparison, wherein said search result is based at least in part on said metadata.

* * * * *

UNITED STATES PATENT AND TRADEMARK OFFICE
CERTIFICATE OF CORRECTION

PATENT NO. : 8,538,941 B2
APPLICATION NO. : 12/184037
DATED : September 17, 2013
INVENTOR(S) : Richard A. Gartland Page 1 of 1

It is certified that error appears in the above-identified patent and that said Letters Patent is hereby corrected as shown below:

In the Claims

Column 11, Lines 30 and 31, between "...an adjustment" and ", said comparing,..." delete "adjusting", therefor.

Signed and Sealed this
Third Day of December, 2013

Margaret A. Focarino
*Commissioner for Patents of the United States Patent and Trademark Office*